United States Patent [19]

Townsend et al.

[11] 4,095,613

[45] Jun. 20, 1978

[54] PNEUMATIC SIDE ROLL MOVER

[76] Inventors: Loren R. Townsend; Morris E. Epp, 1217 Maple, both of Sidney, Nebr. 69162; Walter J. Schmidt, 1809 7th Ave., Scottsbluff, Nebr. 69631

[21] Appl. No.: 790,255

[22] Filed: Apr. 25, 1977

[51] Int. Cl.² .............................................. B05B 3/18
[52] U.S. Cl. ..................................... 137/344; 239/212
[58] Field of Search ............... 137/344; 239/177, 212, 239/213

[56] References Cited

U.S. PATENT DOCUMENTS 3,978,882  9/1976  Cornelius ........................... 137/344

Primary Examiner—Gerald A. Michalsky
Attorney, Agent, or Firm—Zarley, McKee, Thomte, Voorhees & Sease

[57] ABSTRACT

A pneumatic side roll wheel line irrigation system comprising an elongated irrigation pipe supported along the length by a plurality of spaced apart wheels mounted thereon with the pipe serving as an axle for the wheels. A pneumatic side roll mover apparatus is associated with the pipe intermediate the ends thereof for moving the pipe in a sideways direction over the area to be irrigated. The side roll mover apparatus comprises a wheeled frame means which is operatively secured to the pipe for causing the rotation of the pipe whereby the entire length of pipe will be rotated and moved. An air operated hydraulic pump is provided on the wheeled frame and is connected to a hydraulic motor. The drive assembly operatively connects the hydraulic motor to the pipe whereby actuation of the hydraulic motor will cause the rotation of the pipe and will cause the wheeled frame and pipe to be propelled in the sideways direction. Air is supplied under pressure to the air operated hydraulic pump by means of a pneumatic supply.

3 Claims, 6 Drawing Figures

PNEUMATIC SIDE ROLL MOVER

BACKGROUND OF THE INVENTION

The term "side roll mover" is a term ordinarily applied to the power means which is connected to a wheel-line irrigation system for propelling the same in the sideways direction over a field which is to be irrigated. The wheel-line irrigation systems normally comprise an elongated irrigation pipe having a plurality of spaced apart wheels mounted thereon with the pipe being rigidly connected to the wheels and acting as an axle therefor. Ordinarily, a gasoline engine is stationed on a wheeled frame means intermediate the length of the system and is connected to the pipe by a chain assembly whereby the pipe may be selectively rotated which causes the system to be moved sideways to the next irrigating station.

Frequently a plurality of systems are positioned in a spaced apart end-to-end relationship. The standard procedure for moving the system is for the operator to go to the power unit located mid-point in the system, start the gasoline engine and move each system individually to its next position. During the move, the operator is amidst the wet crop foliage and is walking in muddy soil. When the individual system has been moved to its next position the operator must return to the power unit of the next system and repeat the procedure. Plus, it can be seen that it is extremely inconvenient to move the conventional systems and a great amount of time and labor is consumed.

Therefore, it is a principal object of the invention to provide an improved side roll mover.

A still further object of the invention is to provide a pneumatic side roll mover.

A still further object of the invention is to provide a pneumatic side roll mover which is adapted to move a pair of irrigation systems simultaneously.

A still further object of the invention is to provide a pneumatic side roll mover which eliminates the necessity of an operator walking through muddy soil as the system is being advanced.

A still further object of the invention is to provide a pneumatic side roll mover which eliminates the necessity of a gasoline engine which is frequently difficult to start under the moist conditions.

A still further object of the invention is to provide a pneumatic side roll mover which is economical of manufacture, durable in use and refined in appearance.

These and other objects will be apparent to those skilled in the art.

DESCRIPTION OF THE PREFERRED EMBODIMENT

Figure 1:
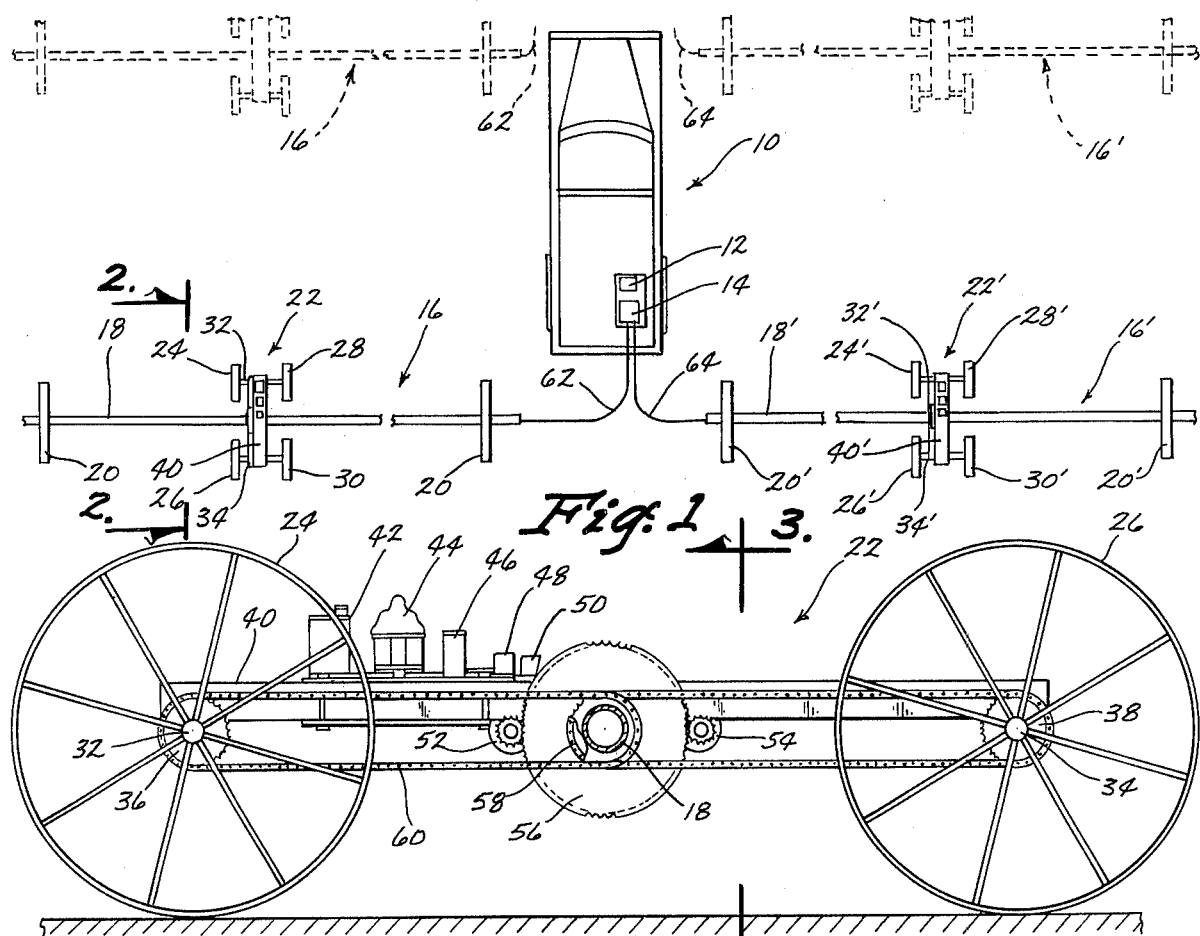
FIG. 1 is a schematic plan view of a typical side roll mover.

Referring to FIG. 1, the numeral 10 refers to a truck or the like having a power unit 12 and air compressor 14 mounted therein. The numerals 16 and 16' refer to a pair of side roll irrigation systems positioned in a field. The broken lines in FIG. 1 illustrate the next watering position of the system 16 and 16'. Inasmuch as the systems 16 and 16' are identical, only system 16 will be described in detail with "'" indicating identical structure on system 16'.

System 16 generally comprises an elongated irrigation pipe 18 having a plurality of spaced apart wheels 20 mounted thereon along the length thereof. The pipe 18 is adapted to be placed in communication with a source of water under pressure at each of its watering positions so that water may be sprinkled over the area to be irrigated at each location or position. Although the drawings do not illustrate sprinkler heads on the pipe 18, it should be understood that conventional sprinkler heads are provided. Each of the wheels 20 is rigidly connected at its center to the pipe 18 whereby rotation of the pipe 18 will cause the wheels 20 to be rotated to move the system in a sideways manner relative to the longitudinal axis thereof.

The numeral 22 refers to the side roll power unit which is associated with the pipe 18 intermediate the ends thereof. Each of the power units 22 comprises four wheels 24, 26, 28 and 30. Axle 34 is secured to wheels 26 and 30 and extends therebetween for rotation therewith. Axle 32 is secured to and extends between the wheels 24 and 28 for rotation therewith. Sprockets 36 and 38 are mounted on axles 32 and 34 respectively as illustrated in the drawings.

Figure 2:
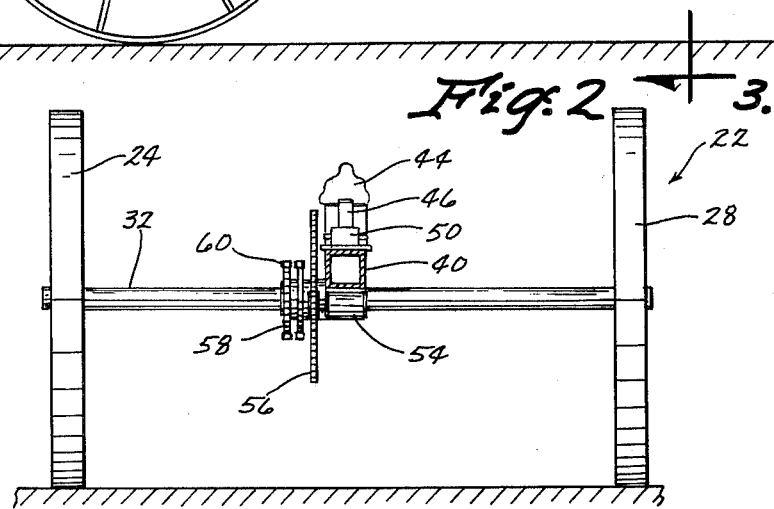
FIG. 2 is an enlarged sectional view seen on lines 2—2 of FIG. 1.
Figures 3, 4:
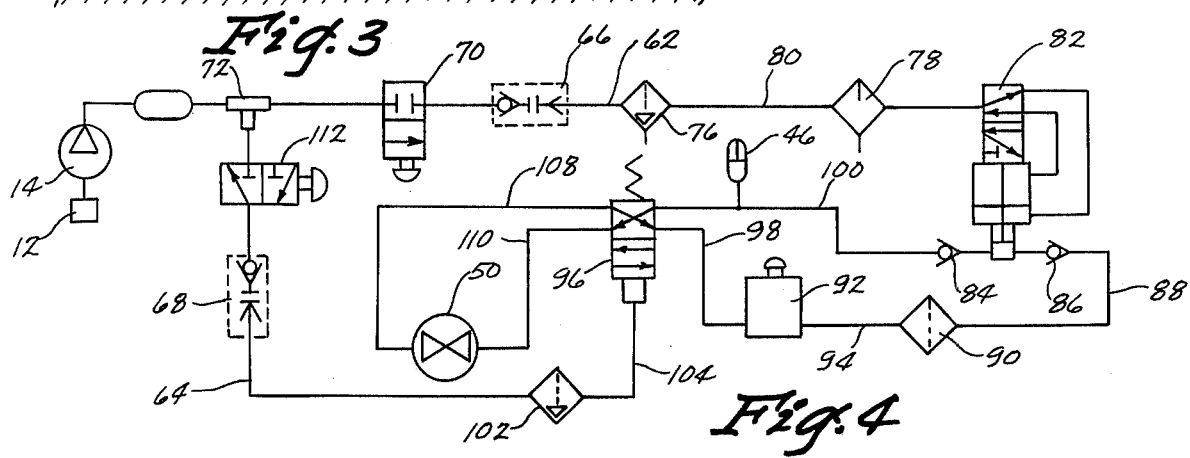
FIG. 3 is a sectional view as seen on lines 3—3 of FIG. 2.
FIG. 4 is a schematic of the air and oil circuitry of the invention.

The base frame 40 extends between the axles 32 and 34 and is designed to support the drive components thereon. Hydraulic tank 42, air-oil pump 44, accumulator 46 and a pilot operated four-way valve 48 mounted on the base frame 40. Accumulator 46 is of conventional design and is designed to absorb the pulsations created by the stroking of the cylinder in the air-oil pump 44. Various other components are also mounted on the base frame 40 but will not be shown in FIGS. 2 and 3 but are illustrated in the schematic FIG. 4. Hydraulic motor 50 is schematically illustrated in FIG. 2 and has a pair of gears 52 and 54 in mesh with gear 56 which is mounted on pipe 18 as illustrated. Sprocket 58 is operatively connected to the pipe 18 for rotation therewith and has a chain 60 mounted thereon which extends around the sprockets 36 and 38. Thus, actuation of the hydraulic motor 50 causes rotation of the gear 56 and sprocket 58 so that rotational movement is imparted to the pipe 18 which will cause the wheels 20 to be rotated whereby the system will be moved laterally. Additionally, actuation of the hydraulic motor 50 also causes the sprockets 36 and 38 to be rotated which causes the wheels 24, 26, 28 and 30 to be rotated. The circuitry of the invention in illustrated in the schematic view of FIG. 4 and reference is made thereto. As seen in FIG. 4, the power unit 12 drives the air compressor 14 which furnishes compressed air to the air lines 62 and 64 which extend to the systems 16 and 16' respectively. Quick disconnect couplers 66 and 68 are provided in the lines 62 and 64 to provide a quick connection to the systems 16 and 16' respectively. The means by which the lines 62 and 64 are extended lengthwise down the systems will be described in more detail hereinafter.

A two-way valve 70 is imposed in air line 62 between the Tee connection 72 and the coupler 66. Line 62 is connected to air line filter 76 which is connected to lubricator 78 by line 80. Lubricator 78 is connected to the conventional air-oil pump 82 which includes check valves 84 and 86. Hydraulic line 88 connects check valve 86 with the filter 90 which is connected to hydraulic or oil tank 92 by line 94. Tank 92 is connected to a pilot operated four-way valve 96 by line 98. The valve 96 is also connected to the check valve 84 as indicated by line 100. Accumulator 46 is provided in the line 100 to absorb the pulsation created by the stroking of the cylinder in the air-oil pump 82.

Valve 96 is connected to an air line filter 102 by line 104. Air line filter 102 is connected to the coupler 68 as illustrated. Lines 108 and 110 extend from valve 96 to opposite sides of the hydraulic motor 50.

In operation, the side roll system is moved as follows. The quick disconnect couplers 66 and 68 are coupled to their respective lines and the two-way valve 70 is manually opened. System air pressure flows through the air line filter 76 and through the air line 80 to the air line lubricator 78 which is mounted on the air-oil pump 82. From the lubricator, the pressure flows through the valving of the air-oil pump causing the piston in the pump to stroke in both directions. As the piston strokes, it draws oil from the tank 92 through the filter 90 and the check valve 86 and forces the oil through the check valve 84 and through the hydraulic line 100. The flow of oil is directed by the pilot operated four-way valve 96 which is used to control the operation of the system in either the forward or reverse mode. From the four-way valve 96, the oil flows through the hydraulic motor 50 developing the necessary torque to drive the side roll power unit through the series of gears, sprockets, and chains as previously described. When the side roll system has reached the desired position, the system is stopped by closing the two-way valve 70.

At any time that it is desired to reverse the direction of travel, the three-way valve 112 is shifted manually to the opened position to allow system pressure to flow through the air line 64, filter 102 to the pilot chamber of the four-way valve 96. As the pilot chamber is pressurized, valve 96 is shifted so that the direction of flow is reversed in the hydraulic motor 50 thereby reversing the direction of travel of the gears, sprockets and chains on the side roll power unit which results in the rotation of the wheels to be reversed by causing the system to be moved in the reverse direction.

At the completion of any system move, the quick disconnect couplers are disconnected and the pneumatic power unit components are available for use in moving other systems or for storage until such time as another system move is required.

Figure 5:
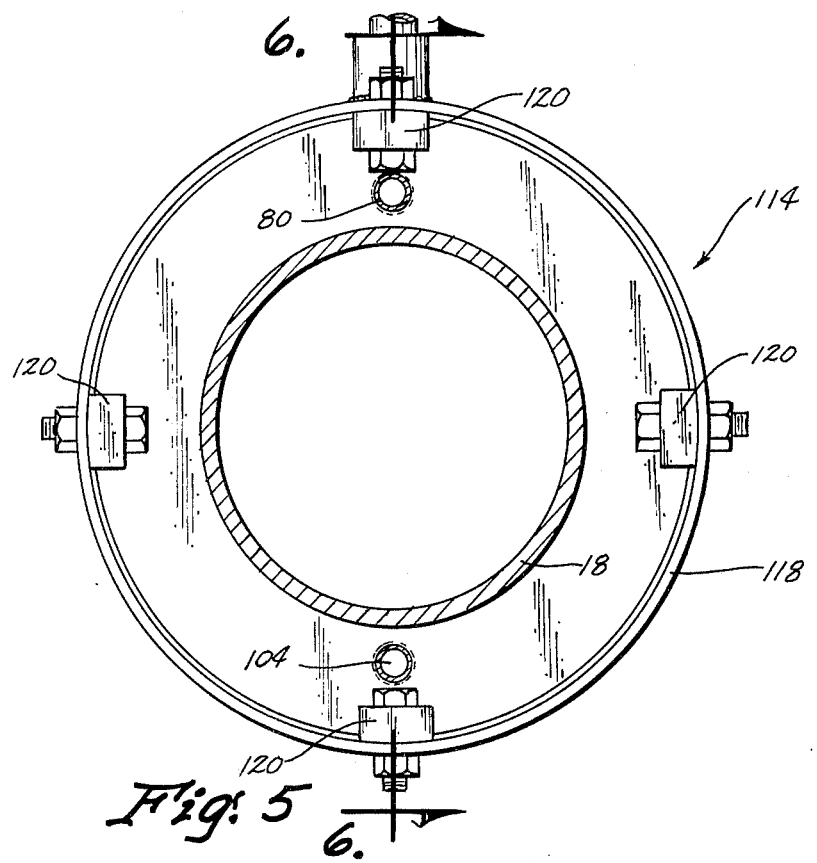
FIG. 5 is a sectional view of a rotating union employed in the invention.
Figure 6:
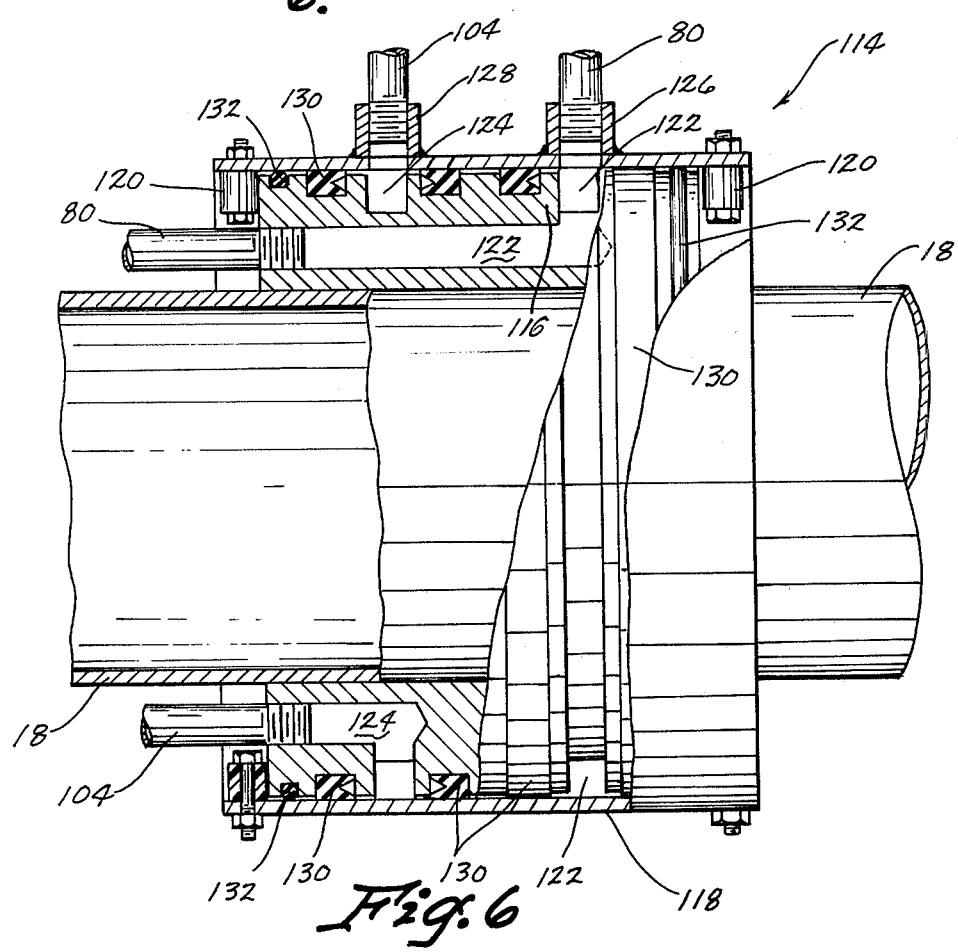
FIG. 6 is a sectional view as seen on lines 6—6 of FIG. 5.

FIGS. 5 and 6 illustrate a rotating union which is employed adjacent each of the power units. The two air lines extending down the length of the pipe such as lines 80 and 104 for example are connected to the pipe for rotation therewith. The rotating union is referred to generally by the reference numeral 114 and is designed to supply the air from the rotating lines 80 and 104 to the non-rotating pump 82 and valve 96. Union 114 generally comprises a duct tube 116 which is rotatably positioned within a cylinder 118. Duct tube 116 is maintained within cylinder 118 by a plurality of bearing blocks 120 secured to cylinder 118 at the opposite ends of tube 116 as illustrated in the drawings. Duct tube 116 is provided with ducts or passage ways 122 and 124 which allow the flow of air from the end of the duct tube to the outer periphery thereof. Attached to the cylinder 118 are ports 126 and 128 which communicate with the ducts 122 and 124 respectively as illustrated.

The inner surface of the duct tube 116 is secured to the outer surface of the rotating pipe 18 by welding or the like. The cylinder 118 is operatively connected to the base frame 40 at the power unit so that rotation of the cylinder 118 is prevented. As the air travels around the ducts 122 and 124 the outer periphery of the duct tube 116, they are contained within the V-block seals 130 so as to prevent any leakage and to direct their flow either to or from the ports 126 and 128 in the cylinder. An "O" rings seal 132 is located at each end of the duct tube 116 so as to prevent any contamination of the cylinder walls or duct tube surface and the seals.

Thus, the rotation of the pipe 18 by the drive unit causes the air lines 80 and 104 to be rotated since they are secured thereto. The air lines 80 and 104 are operatively connected to the ends of the ducts 122 and 124 respectively so that air is supplied to the ports 126 and 128 respectively. Thus, the primary purpose of the union 114 can be seen to convey the air outwardly to the pump and valve from the rotating air line 80 and 104.

Thus it can be seen that a novel pneumatic side roll mover has been provided which accomplishes at least all of its stated objectives.

We claim:

1. In combination,
a side roll wheel line irrigation system comprising an elongated irrigation pipe having opposite ends and being supported by a plurality of spaced apart wheels, said pipe serving as an axle for said wheels,
at least one pneumatic side roll mover apparatus associated with said pipe for moving said pipe in a sideways direction over the area to be irrigated,
said side roll mover apparatus comprising a wheeled frame means operatively secured to said pipe, an air operated hydraulic pump means on said frame means connected to a hydraulic motor drive means operatively connecting said hydraulic motor to said pipe whereby actuation of said hydraulic motor will cause said wheeled frame means and said pipe to be propelled in said sideways direction,
and pneumatic supply means for supplying air under pressure to said air operated hydraulic pump means.

2. The combination of claim 1 wherein said pneumatic supply means is mounted on a driven vehicle at one end of said pipe, and an air supply line extending from said pneumatic supply means lengthwise along said pipe to said air operated hydraulic pump means.

3. The combination of claim 2 wherein a pair of irrigation systems are positioned in an end-to-end spaced apart relationship and wherein driven vehicle is positioned between the pair of systems, said pneumatic supply means on the vehicle being connected to the pneumatic side roll mover apparatus on both of said systems.

* * * * *